Sept. 29, 1970 W. G. BODIE 3,531,599

AUTOMATIC ENCODER FOR A COMMUNICATIONS SYSTEM

Filed Dec. 18, 1967 4 Sheets-Sheet 1

William G. Bodie,
INVENTOR.

BY C. A. Phillips

ATTORNEY.

Sept. 29, 1970 W. G. BODIE 3,531,599

AUTOMATIC ENCODER FOR A COMMUNICATIONS SYSTEM

Filed Dec. 18, 1967 4 Sheets-Sheet 2

William G. Bodie,
*INVENTOR.*

BY

C. A. Phillips
ATTORNEY.

AUTOMATIC ENCODER FOR A COMMUNICATIONS SYSTEM

Filed Dec. 18, 1967 4 Sheets-Sheet 3

William G. Bodie,
INVENTOR.

BY

C. A. Phillips

ATTORNEY

Sept. 29, 1970 W. G. BODIE 3,531,599

AUTOMATIC ENCODER FOR A COMMUNICATIONS SYSTEM

Filed Dec. 18, 1967 4 Sheets-Sheet 4

William G. Bodie,
*INVENTOR.*

BY

*C. A. Phillips*

ATTORNEY.

United States Patent Office 3,531,599
Patented Sept. 29, 1970

3,531,599

AUTOMATIC ENCODER FOR A COMMUNICATIONS SYSTEM

William G. Bodie, 1703 Wilma Circle, SE., Huntsville, Ala. 35801

Filed Dec. 18, 1967, Ser. No. 691,476
Int. Cl. H04m *11/45*
U.S. Cl. 179—90 6 Claims

ABSTRACT OF THE DISCLOSURE

An automatic calling system for a telephone in which names of parties frequently called are alphabetically arranged and displayed in columns and rows and by means of a column push-button and row push-button any desired party may be called, telephone encoding being accomplished by the automatic control of electrical or mechanical linkage between this system and the phone to which it is linked.

This invention relates to communication systems and particularly to automatic systems for accomplishing the selection of a communications channel such as occurs in the dialing of a telephone.

In the past few years several systems have appeared for simplifying and speeding the process of dialing a number on a telephone. However, it has been observed that the systems thus far available tend to retain certain time consuming steps such as the necessity of locating and then accurately aligning the party's name on a tape with an index marker, or finding and inserting a party's card in order to initiate dialing. Aside from the tedium and delay associated with these systems such functions are substantial obstacles for certain persons with physical infirmities and children unable to read.

It is the object of the present invention to provide an improved system where party selection is simple and rapid, and appropriate encoding through a communications system, telephone or other multichannel system, is quickly and accurately accomplished by operating two switches.

In the automatic calling system of this invention a matrix of parties frequently called is arranged alphabetically from left to rightand displayed in columns and rows as is a corresponding switch matrix. The switching matrix has a plurality of column responsive switches and a plurality of row responsive switches in which the operation of a particular column switch and row switch locates a set of contacts (one contact for each digit of a telephone number) of a programmer, which establish a predetermined sequence of current paths, and together with other circuitry initiates calling or dialing of the selected party's telephone number.

The programmer is an electrical stepping switch consisting of ganged levels or rows of fixed contacts, one row for each row of the matrix, and each row is divided into sets of contacts corresponding to the columns of the matrix. The number of contacts in a set is dependent upon the number of digits in a telephone number, normally seven. There are moving contacts or wipers for each row or level of fixed contacts ganged on a common shaft and the moving contacts are driven by electro-mechanical means such as a solenoid coil which cocks a spring upon the receipt of an electrical pulse and upon the decay of the pulse the spring causes the moving contacts to be moved or stepped from one fixed contact to the next fixed contact in the row. Inasmuch as one of the ganged moving contacts initially also provides a finding function they are caused to step rapidly, usually sixty steps per second, and it is thus necessary to provide means for instantly and precisely stopping the moving contacts at the first digit contact of a desired set of the programmer.

The momentary closing of any column switch initiates the stepping action and the choice of the particular column switch determines the point of stopping of the moving contacts. Upon the momentary closing of a column switch, which is the first function to be performed in selection, a potential is placed upon the first contact of a set of contacts on one of the rows and corresponding to the particular column switch closed. Means are then provided to sense through the moving contact the potential on the fixed contact and to instantly de-energize the stepping switch operating coil causing the moving contact to come to rest on the desired fixed contact. This contact position (that is the fixed contact for each row) represents a column position for the first digit of each telephone number on every row in that particular column. Thus at this point the column aspect of location has been achieved.

Next, by means of row selection circuitry which is energized by closing of a particular row switch, a potential is applied to the moving contact of the particular row selected and inasmuch as momentary switches are employed, means are provided for sustaining the potential on the moving contact of the selected row.

Telephone numbers to be automatically called are uniquely determined by the current supply paths from programmer contacts to the number control terminus and connection of that path to the dial synchronizer circuitry. A current supply path for each digit is established by connection of a fixed contact of the programmer to a given terminal board of ten terminal boards which make up the number control terminus. Number changes are accomplished by changing connections of a given set of contacts of the programmer to the number control terminal boards.

After row selection has been made and a potential applied from the moving contacts through the particular fixed contact in contact with the moving contact to the particular terminal point representative of a digit, digit encoding means, mechanical or electrical, is initiated causing the first digit of the number called to be encoded through the communications system.

Through means of a programmer advance system, the stepping switch and the moving contacts are stepped one position and the moving contacts for the row which has been selected are now positioned on the second contact of the set and supplies current through the circuit path representing the second digit to be encoded. The process of encoding is repeated and the process of program advance repeated until all digits of a number have been encoded. At this point the program advance system is prevented from applying a pulse to the stepping switch and by means of a reset circuit power interruption occurs which allows the system to come to rest until a new selection is made by momentarily closing a column switch and then a row switch.

These and other objects, features and advantages of the invention will become more apparent from the following description when considered together with the drawings in which.

Figures 1, 2:
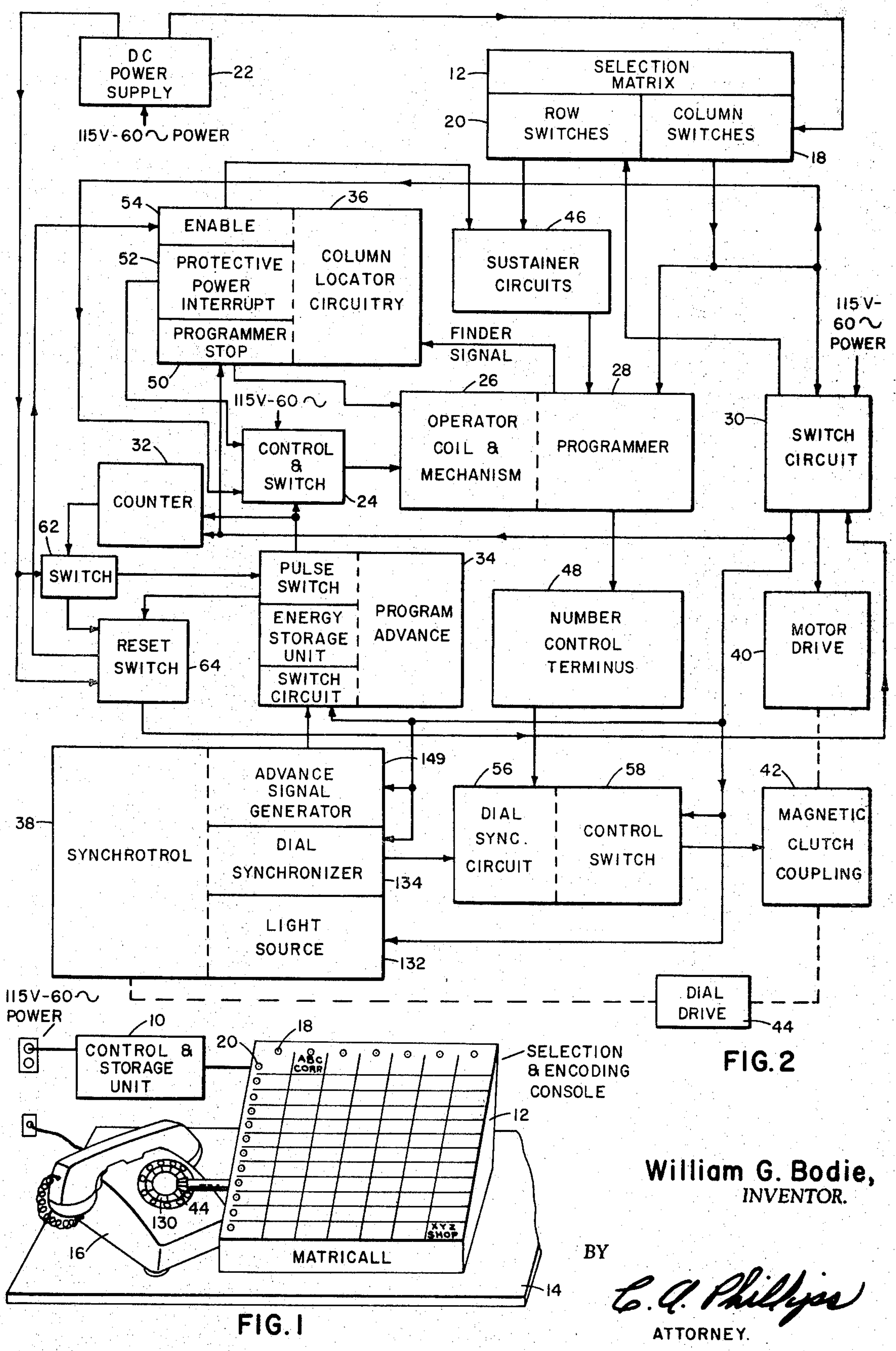
FIG. 1 is a pictorial view illustrating one configuration of the invention.
FIG. 2 is a block diagram illustrative of an embodiment of the invention.

The system illustrated in FIG. 1 is arranged in three physical groupings, control and storage unit 10, selection and encoding console 12 and mounting base 14. Of these the selection and encoding console 12 is located immediately adjacent to the telephone 16 and its position is fixed with respect to the telephone by the mounting base. The encoding mechanism interfaces with the telephone dial through gears positioned and sized to allow conventional manual dialing of numbers not generated by circuit paths stored in the system.

The names are alphabetically arranged from left to right and top to bottom on the selection and encoding console 12 as are column switches 18 and row switches 20 and the system has been named "Matricall" which is derived from this array of names and selection switches. By means of this system of arrangement, simplicity of operation and rapid selection of parties are provided.

The functional arrangement of the system is shown in FIG. 2. Column switches or switching circuits 18 when energized by DC power source 22 perform several functions. A sixty cycle AC input to control and switching circuitry 24 is turned on and this provides a stepping pulse output to operator coil 26 of programmer 28. A DC stopping potential is furnished programmer 28 in order to stop the programmer on the first contact of the set selected. A switching potential is applied to switching circuit 30 which switches on or furnishes power for several other circuits including counter 32, program advance circuitry 34, column locator circuit 36 and synchrotrol 38, the latter serving to synchronize the dialing system with the telephone and provide a signal indicating when a given digit has been dialed in order to proceed with the dialing of the next number. Switch circuit 30 also energizes motor drive 40, which through magnetic clutch coupling 42 and dial drive 44, powers the actual dialing of telephone 16.

Row switching circuit 20 provides through sustainer circuit 46 a sustained potential on the moving contact of the stepping switch of programmer 28, to be described in connection with FIG. 3, to provide current flow through programmer 28, number control terminus 48 and other circuitry to produce dialing.

Column locator circuit 36 is subdivided into three elements as follows: one, programmer stop 50 which provides means to achieve high speed switching of a shunting circuit across operator coil 26 of programmer 28; two, protective power interruption circuit 52 which serves to prevent excessive heating in the event that a column switching circuit 18 is held in the closed position longer than the period necessary to activate it; (a maximum time of approximately .75 seconds is sufficient to cause it to accomplish its necessary function) and; third, an enable circuit 54 which applies current to the row sustainer circuits 46, and triggers circuits 50 and 52 on.

Dial synchronizer circuits 56 are controlled by dial synchronizer 134 of synchrotrol 38 and through magnetic clutch control switch 58 stops the rotation of the telephone dial in accordance with a predetermined current path through the number control terminus 48.

Advance signal generator 136 of synchrotrol 38 produces a signal through which program advance 34 and control and switching unit 24 cause programmer 28 to move to the next "digit to be dialed" position.

Counter 32 is a six bit counter which through switch 62 and reset switch 64 serves two purposes, one, to stop the programmer after a number is encoded and two, to reset the system for another dialing operation.

Figure 3:
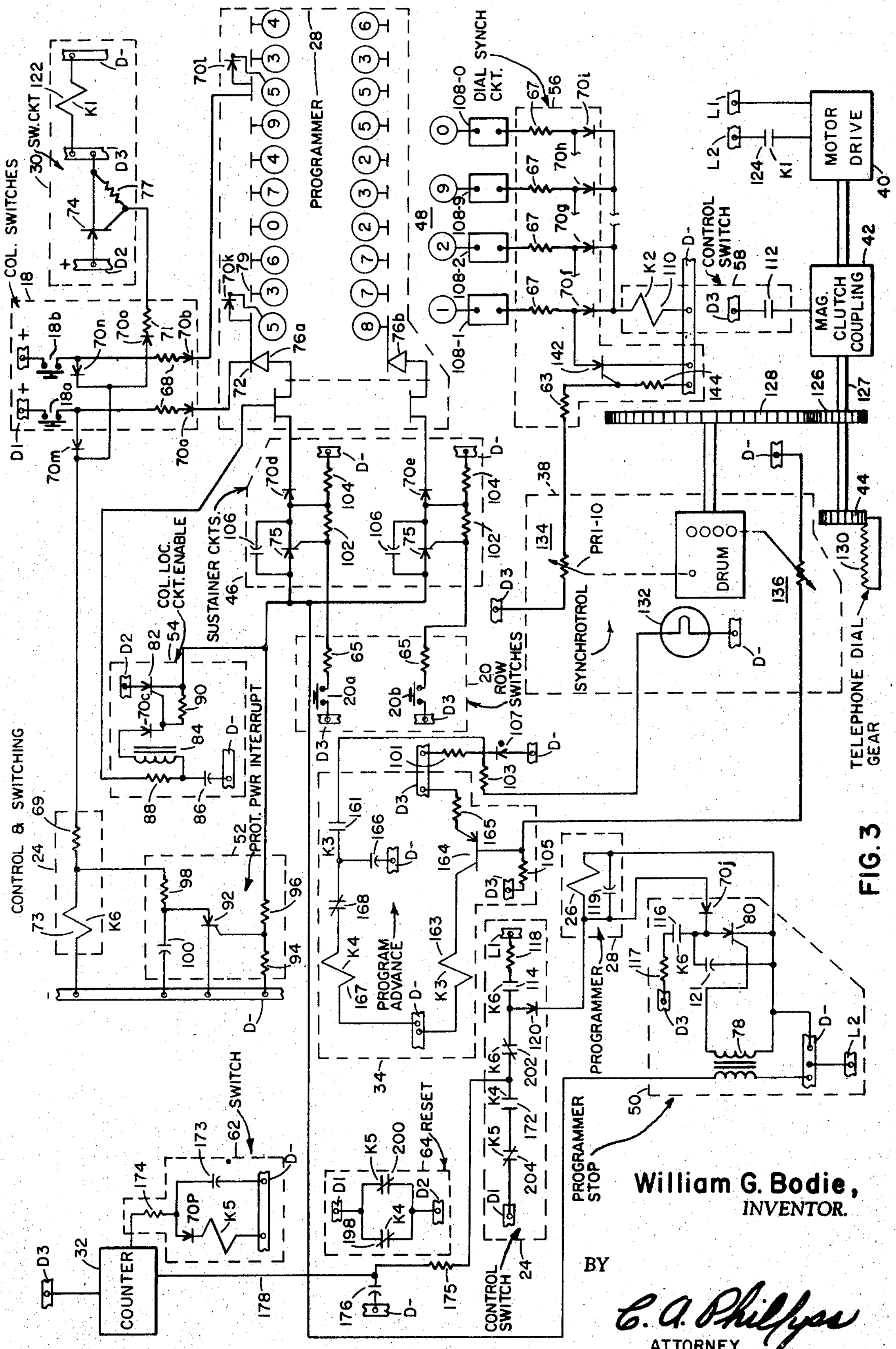
FIG. 3 is an electrical schematic circuit diagram of the invention as illustrated by FIG. 2.

Referring now to a more detailed description and particularly to FIG. 3, column switching circuit 18 includes a momentary contact, normally open, switch 18*a*, *b*, *c*, etc., one for each of the seven columns (only two are shown) of the matrix. One terminal of column switch 18*a* is connected to a positive terminal D1 of a twenty-four volt DC supply and the other terminal is connected to several units of the system as follows: through dropping resistor 68 and blocking diode 70*a* to terminal 72 of programmer 28 representative in each instance of the first digit of a party's number in column one (two numbers are partially illustrated on row one of the system). Switch 18*a* is also connected through a similar diode 70*m* and resistor 69 to relay coil 73 of relay K6 of control and switching circuitry 24 and through a similar diode 70*o*, and resistor 71 to the control electrode of silicon control rectifier (SCR) 74 of switch circuit 30.

Row switching circuits 20 employ momentary contact, normally open, switches 20 *a*, *b*, etc., one for each row of the twelve rows of the system, only two rows of row switching circuits 20 and sustainer circuits 46 being shown. One terminal of each row selection switch is connected to bus D3 which is energized through SCR 74 from positive twenty-four volt DC bus D2 whenever a column switch has been previously momentarily closed. The other terminal of each row switch connects through a current limiting resistor 65 to the control electrode of an SCR 75 in sustainer circuit 46.

As will be noted, party numbers have been assigned to the contacts of programmer 28 and the number for the column one, row one position is 536–0749. This number occupies a set of seven contacts in sequence on the programmer. Each of these contacts is connected to the number control terminus 48 terminal board which represents the number. It is necessary to connect the first digit of the finder row set of contacts through blocking diodes 70*k* to prevent feed back finder signals from stopping the programmer at the wrong column position.

Programmer 28 is a twelve level or row, fifty-two position (only 49 positions are used) commercially available stepping switch which supplies current sequentially through the paths of the number control terminus and hence to relay K2 of control switch 58 for operating magnetic clutch coupling 42. The capacity of programmer 28 determines the number of parties that can be accommodated by the system. When any of the column selector switches are operated a current limited DC signal is injected on the first position of the selected column so that when the wiper, moving contact 76*a* makes contact a "finder" signal is conducted to column locator circuit 36.

Column locator circuit 36 is divided into three elements as follows: one, programmer stop 50 includes transformer 78 the secondary of which is connected to the gate of SCR 80 which when triggered provides a current shunt around programmer operating coil 26. This shunt causes operator coil 26 to be by-passed or shorted out of the circuit within a few microseconds after the "finder" signal is conducted to the gate of SCR 82 of enable circuit 54, the second element of column locator circuit 36. The programmer is therefore stopped precisely on the first digit of the selected column. Enable circuit 54 includes an input filter circuit combination of choke 84, capacitor 86, resistor 88, gate biasing resistor 90 and blocking diode 70*c*. Enable circuit 54 supplies current to the sustainer circuits 46 after the finder signal has been conducted to SCR 82 and the unit has fired. The third element is a protective power interrupt 52 which includes SCR 92, gate voltage dividing resistors 94 and 96, filter element resistor 98 and capacitor 100.

Sustainer circuits 46 include for each row an SCR 75, resistor 102, resistor 104, capacitor 106 and blocking diode 70*d*, etc. and function to supply current to the programmer during the complete dialing cycle. Resistor 104 in the cathode circuit of SCR 75 serves to maintain "hold in" current during the several millisecond period when wiper contacts 76*a*, *b*, etc. of the programmer are moving from one fixed contact to another and thus when load current would otherwise be removed from SCR 75. Capacitor 106 is connected across SCR 75 and reduces the rate of rise of voltage across the anode-cathode to prevent firing upon the application of a potential to the anode.

Each terminal board 108 (of boards 108–1 to 108–0) of number control terminus 48 is connected through a load limiting resistor 67 and isolation diode 70f etc. of dial synchronizing circuit 56 to operating coil 110 of relay K2. Each terminal board 108 represents a digit from one to zero and like designated fixed contacts of programmer 28 are connected to like designated terminal boards 108. Normally open contacts 112 of relay K2 of control switch 58 are powered from bus D3 to energize magnetic clutch coupling 42 when relay K2 is operated. Each operating relay coil except K4 has across it a filter circuit consisting of a resistor and capacitor which prevents high voltage transients from developing when a relay coil is de-energized and these are omitted to prevent undue crowding of the drawing.

Upon being energized by one of the column switches, relay K6 closes normally open contacts 114 of switching and control circuit 24 and closes normally open contacts 116 of relay K6 in program stop circuit 50 of column location circuit 36. This switching action provides through resistor 118 and rectifier 120 sixty pulses per second to operator coil 26 of programmer 28 so that the wiper or moving contacts 76a, *b*, etc. of the programmer sweep the entire span of fifty-two fixed contacts of each row in approximately .87 second. The closure of relay K6 contacts 116 provides a source of current to the anode of SCR 80 so that shunting will be maintained across the programmer operator coil after initial firing of SCR 80 by the one-time pulse from transformer 78. If this were not provided SCR 80 would be cut off during the negative half of the sixty cycle wave which would remove the shunt around programmer coil and when the next positive half wave of the sixty cycle current occurred the operating coil would be energized thus cocking the programmer advance spring which when released would put the movable contacts 76a, *b*, etc. of programmer 28 on the wrong position. The protective power interrupt circuit 52 is not always fast enough to prevent the action described and cannot be relied upon for this function. SCR 92 of protective power interrupt 52 is connected through filter resistor 98 across coil 73 of relay K6 and provides a protective feature of interrupting the sixty pulses per second power supply to operator coil 26. This is provided inasmuch as if one held the column selector switch in a closed position excessive heating would develop in the current limiting resistor 118 of the programmer operating coil circuit.

Upon depressing a column switch 18, SCR 74 of switch circuit 30 is energized to operate relay coil 122 of relay K1 to close contacts 124 and start motor drive 40. Motor drive 40 provides torque through magnetic clutch coupling 42, drive gears 126 and 128 which operate synchrotrol 38 and dial drive 44, respectively. A circular dial gear 130 attached to telephone 16 is driven by dial drive 44.

Synchrotrol 38 consists of light source 132, dial synchronizer 134, and advance signal generator 136. Light source 132 radiates through perforations in drum 146 to illuminate photo-resistor 136 and photo-resistors PR 1–10.

Dial synchronizer 134 of synchrotrol 38 consists of a plurality of photo-resistors PR 1–10 each of which is biased twenty-four volts positive from bus D3 and is connected through load limiting resistor 63 in dial synchronizer circuit 56 to the gate of a SCR 142, there being one each such circuit for each digit, 1–10 and each such SCR being connected through an isolation diode 70f etc. across relay coil 110 of relay K2. The function of dial synchronizer circuit 56 and control switch 58 will be further explained but basically their function is to selectively detect when the telephone dial is rotated to a selected digit and to cause the dial to be released by means of SCR 142 shorting relay coil 110 of control switch 58 and opening contacts 112. This causes magnetic clutch coupling 42 to disengage motor drive 40 and dial drive 44. Resistor 144 completes the biasing circuit for SCR 142.

Figure 5:
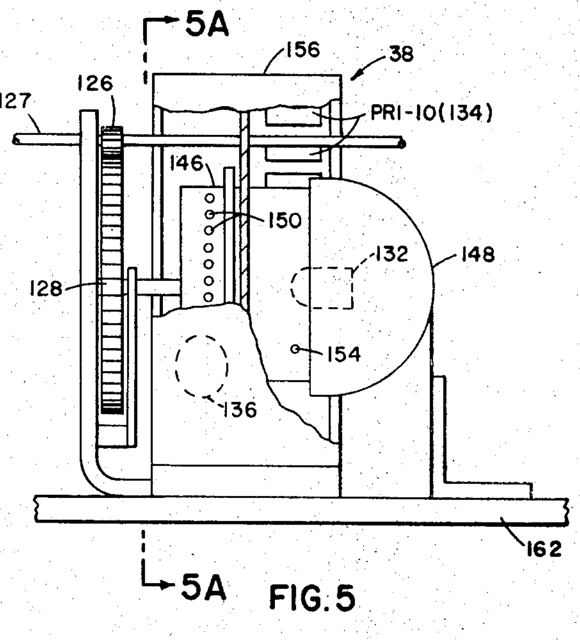
FIG. 5 is an elevation view of a dial synchronizer, light source and advance signal generator
Figure 5A:
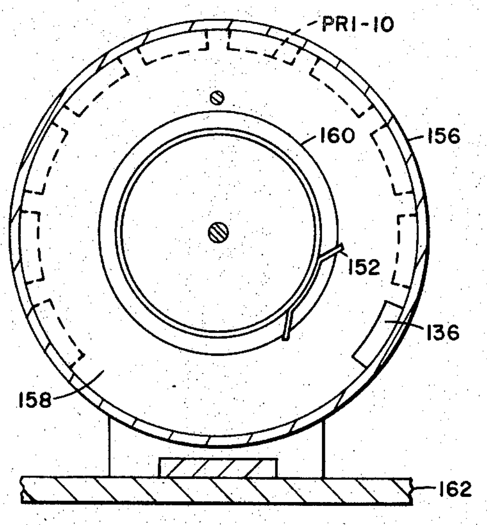
FIG. 5A is a sectional view of a portion of FIG. 5.

The physical features of synchrotrol 38 are illustrated in FIGS. 5 and 5*a*. Drive gear 126 on shaft 127 drives drum drive gear 128 which in turn drives rotor or rotating drum 146. Light source 132 is located within a light chamber 148 at one end of rotating drum 146 and emits visible light through two sets of apertures which illuminate photo-resistors.

Advance signal generator 149 basically employs light beam apertures 150 in rotor 146, light source 132 and photo-resistor 136, the latter receiving light during the interval that dialing occurs and being shielded from light by light shield 152 on rotor 146 when the telephone dial is at rest.

Dial synchronizer 134 employs a single aperture 154 in rotor 146 and ten dial synchronizer photo-resistors PR 1–10 mounted around stator 156 at thirty degree intervals as particularly illustrated in FIG. 5*a*. Light source 132 is mounted in light chamber 148 and powered through a cable, not shown. Stator 156 includes a light shield 158 which serves to protect PR 1–10 from light being emitted through apertures 150. Rotor light shield 160 is mounted on rotor 146 and serves to further protect PR 1–10 from light being emitted through apertures 150. The synchrotrol stator assembly is mounted on base 162 of selection and encoding console 12.

Photo-resistor 136 of advance signal generator 149 is mounted on the stator portion of synchrotrol 38 so that it is engaged by a light beam at all times when the telephone dial has moved a few degrees from its normal resting position.

When photo-resistor 136 is in a dark mode, its high resistance mode, transistor 164 of program advance 34 is effectively turned off and relay K3 is de-energized which in turn causes the energy stored in capacitor 166 to dissipate through normally closed contacts 168 of relay K3 through relay coil 167 of relay K4. This causes relay K4 to close normally open contacts 172 of control and switch 24 for approximately thirty milliseconds time until the energy stored in the capacitor 166 is dissipated through coil 167.

Figure 4:
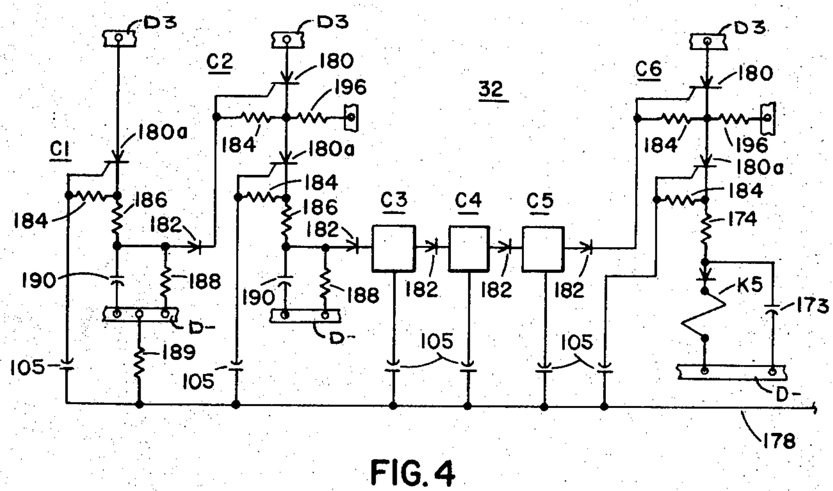
FIG. 4 is an electrical schematic circuit diagram of an electrical counter employed in the embodiment of the invention shown in FIGS. 2 and 3.

Counter 32, shown in detail in FIG. 4, is a six bit or stage counter which stops the encoding process and resets the system after seven digits have been encoded. Only six bit capacity is required as the digits are not registered until the telephone dial returns to the index position and the operation of relay K5 of switch 62 is delayed by the action of capacitor 173 and resistor 174 to allow programmer operating coil 26 to cock the armature spring of programmer 28 for the seventh digit on the sixth operation of relay K4.

Counter 32 may be modified to accommodate any number of digits such as for areas where five digits are adequate for party identification. A particular feature of the counter is that the input signal applied through filter resistor 175 and capacitor 176 and lead 178 momentarily switches the signal input SCR's of all stages "on." Therefore a shifting operation is not required to switch the input signal from one stage to the next. The principle of this counter's operation is that only the signal input SCR which has an anode current supply at the instant of an input signal will be "latched" on when every input signal triggers on all unlatched signal input SCR's of the counter. This means that two conditions are necessary to latch any input SCR on, i.e., the previous stage must have fired to open the gate of the booster SCR and thus provide an anode current supply to the SCR to be triggered by the next signal to be counted, and two, the triggering signal applied. The value of the RC time constant controls the counter rate and this is chosen for compatibility with the input signal. Each stage of counter 32 except the first stage contains two identical SCR devices 180 and 180a, the stages being labeled C1 through C6. Stages C3, C4 and C5, being identical to stage C2, are represented only by block diagrams. Diodes 182 provide interstage isolation between stages. Resistors 184, 186 and 188 and capacitor 190 combination provide proper biasing and time constant for the counter stages. Resistor 196 provides "hold in" current for SCR 180 in stage C2; each succeeding stage incorporates a similar unit. Resistor 189 functions to discharge the input capacitors after each signal is received. Counter output switching is by switch 62 and is accomplished by means of relay K5. The operation of relay K5 is delayed by an RC circuit consisting of resistor 174 and capacitor 173 after stage C6 has fired to permit a programmer operating spring (not shown) to be cocked. When the spring is released, upon the decay of the sixth pulse to the programmer operating coil, programmer movable contacts move to the next or seventh position. Sufficient delay time is secured by the circuitry described to prevent the operation of K5 until the seventh position is reached.

Reset switch 64 consists of normally closed contacts 198 of relay K4 and normally closed contacts 200 of relay K5, these contacts being parallel and connecting bus D1 and bus D2. Reset switching is accomplished by joint action of relays K4 and K5. Switch 64 functions as an "and" control in that reset is accomplished only with concurrent operations of K5 and K4, that is when both open. Reset is achieved by disconnecting bus D2 from bus D1 momentarily which removes power from switch circuit 30 and enable circuit 54 to remove power from counter 32, program advance circuit 34, motor drive 40, programmer stop circuitry 50, and protective power interrupt 52 thus achieving reset.

Control and switch circuit 24 contains relay K6 having operating coil 73, and normally closed contacts 202 and normally open contacts 114, current limiting resistor 118 and a power rectifier diode 120, resistor 118, and contacts 114, diode 120 being in series with operating coil 26, between AC power terminals L1 and L2. Switch and control 24 also contains normally open contacts 172 of relay K4 and normally closed contacts 204 of relay K5.

The caller locates the party he desires to call in one of the seven columns on the matrix. Assuming that the party is in column one, the column one switch 18*a* is closed for a maximum of .75 second. Switch 18*a* when closed supplies a positive direct current potential to contact 72 of stepping switch or programmer 28 through resistor 68 and diode 70*a*. At the same time switch 18*a* energizes coil 73 of relay K6 through a diode 70*m* and current limiting resistor 69. Contacts 114 of relay K6 close and contacts 202 open. Sixty positive pulses per second are then supplied through resistor 118 and rectifier 120 of control and switching circuitry 24 to operating coil 26 of stepping switch 28 from terminals L1 and L2, which are terminals for 115 volts sixty cycle supply. This causes the programmer operating coil to operate sixty times per second and to cause the moving contacts 76*a*, *b*, etc. associated with it to move or step along the stationary contacts at a rate of sixty contacts per second until stopped. Actually stepping occurs at the end of each pulse as each pulse cocks a spring which causes "stepping" in a manner not shown but used on indirect drive stepping switches. Energizing K6 also causes normally open contacts 116 to close to apply an operating bias through resistor 117 to SCR 80 of programmer stop 50.

The closing of a column switch 18*a* also causes certain other functions to occur. One, power is applied to the gate of SCR 74 which triggers on to apply approximately twenty-four volts bias between bus D3 and D minus to cause relay coil 122 of relay K1 to operate and close relay contacts 124 of relay K1 to energize motor drive 40. With the energizing of bus D3 power is also made available through resistor 101 to one contact of relay K3 and through resistor 103 to light source 132. Power is also applied to a voltage divider network consisting of resistor 105 to program advance 34 and photo-resistor 136 of advance signal generator 149 of synchrotrol 38. In addition, terminal D3 now provides power to energize counter 32 and row switches 20*a*, *b*, etc. of row switching circuit 20.

With the programmer or stepping switch running at sixty pulses per second across the sweep of fifty-two contacts it becomes necessary to stop the moving contact of the programmer at the first digit of the number to be dialed presuming, that it is the first number on the first row as illustrated. Stopping is initiated as follows: a finder signal is placed on contact 72 by virtue of the closing of column switch 18*a*. When movable contact 76*a* contacts fixed contact 72 the finder signal bias which has been applied to contact 76*a* is applied through a filter circuit consisting of resistor 88, capacitor 86 and inductor 84, and through diode 70*c* to the gate of SCR 82.

The filter circuit and SCR 82 are in enable circuit 54 of column locator circuit 36. Resistor 90 applies a gating voltage for SCR 82. Other loads being supplied through SCR 82 are a current path through resistor 96 to the input of SCR 92 of protective power interrupt circuit 52, a path to provide anode current to SCR 75 of sustainer circuit 46 and a path through the primary of transformer 78 of programmer stop 50.

When SCR 82 of enable circuit 54 is switched on, SCR 92 is triggered on and as it is connected through filter resistor 98 and capacitor 100 of protective power interrupt 52 across relay coil 73 of relay K6, the latter is de-energized. However, due to the mechanical nature of relays its contacts do not open immediately. The transient suppression RC circuit also slows its drop-out time so that other means must be provided to assure that movable contact 76*a* stops on stationary contact 72. Therefore to provide instant stopping of contact 76*a* the initial pulse generated by the firing of SCR 82 is applied through transformer 78 to the gate of SCR 80 of program stop 50 which fires and provides a shunting path through diode 70*j* around coil 26 within mircoseconds; thus even if K6 contacts 116 and 114 are still closed when the next positive half wave of sixty cycle current occurs the current is shunted around coil 26 with no movement of contact 76*a* beyond fixed contact 72 until SCR 80 switches to the "off" state. Capacitor 119 across coil 26 prevents high voltage transients when operating coil 26 is de-energized and capacitor 121 of program stop 50 which is connected across SCR 80 reduces the rate of rise of voltage across the anode-cathode when contact 116 of K6 closes. Circuit 52 has caused relay coil 73 of relay K6 to be de-energized and sixty cycle current is no longer applied to programmer operator coil 26 and thus programmer 28 remains stopped. With relay coil K6 de-energized power for SCR 80 previously supplied through normally open contacts 116 of program stop 50 is removed to allow turn off of SCR 80 and thus the current shunt around operator coil 26 is removed.

Now with programmer 28 stopped the next step is row selection of the row in which the party to be called is positioned. Assuming that it is row one and column one, now depress row switch 20*a* which triggers on SCR 75 of row one and we supply current through the anode circuit of SCR 75 and a diode 70*d* through moving contact 76*a* to fixed contact 72 of programmer 28, contact 76*a* then resting on fixed contact 72. Thus the circuit is now such that instead of power being applied by fixed contact 72, which was the case when column one switch 18*a* was originally depressed, power is now applied by moving contact 76*a* to fixed contact 72. From fixed contact 72 current flows through an isolation diode 70*k* to a common bus terminal to cause magnetic clutch 42 to be energized, current flow being through terminal five of number control terminus 48, load limiting resistor 67, and an isolation diode 70 to relay coil 110 of relay K2. Contacts 112 then close, clutch 42 engages and motor drive 40 is coupled to dial drive 44 and dial drive 44 rotates the dial of telephone 16 and drum 146 of synchrotrol 38, the dial being rotated toward the position of a number to be dialed. As the dial is rotated and drum 146 of synchrotrol 38 rotates, aperture 154 directs a light beam to each of photo-resistors 1, then 2, then 3, then 4, and then 5. As the beam strikes each of photo-resistor PR 1 through 4 a triggering signal is applied to each associated SCR 142 S 1–4 of dial synchronizer circuit 56 but none of these SCR devices have anode current supplied and thus they return to the "off" state as soon as the light beam passes. When, however, dial drive 44 is rotated sufficiently to dial a "5" and PR5 is illuminated, its resistance drops and SCR 142 S–5, which is biased through terminal five of number control terminus 48 from contact 72, is triggered to immediately short circuit relay coil 110 of relay K2 through an isolation diode 70*f* etc. Isolation diodes 70 prevent cross-coupling betwen anode paths for SCR 142 devices S 1–10. K2 now de-energizes and contacts 112 open with the telephone dial at the "5" position. Clutch 42 then disengages and the dial returns to its resting position having encoded a "5" digit. With drum 146 of synchrotrol 38 back at its resting place photo-resistor 136 is placed in a dark zone, that is not illuminated by light 132 and thus causes relay coil 163 of K3 of program advance 34 to be de-energized as follows. During the time that the dial was moving and light was striking photo-resistor 136 through apertures 150 an operating bias was applied to transistor 164 causing current to flow from bus D3 through resistor 165, transistor 164 and coil 163 of relay K3 causing K3 to operate. Normally open contacts 161 of K3 then close and normally closed contacts 168 open. This causes capacitor 166, energy storage unit, of program advance 34 to be charged through resistor 101 to a voltage determined by Zener diode 107. When the telephone dial returns to zero and drum 146 of synchrotrol 38 returns to its resting place and no light reaches photo-resistor 136 through apertures 150, by reason of shield 152, the resistance of photo-resistor 136 increases, transistor 164 cuts off with the result that the normally open contact 161 of relay K3 opens and the normally closed contact 168 of K3 closes and as a result capacitor 166 discharges through coil 167 of relay K4 resulting in K4 being energized for approximately thirty milliseconds. So there is a rather precise cycle to go through before K4 is de-energized and it depends upon the charge on capacitor 166. K4 is held on for a period of time long enough to supply a pulse from bus D1 through normally closed contacts 204 of relay K5, through the now closed relay contacts 172 of relay K4, through normally closed contacts 202 of relay K6 and, through rectifier 120 to programmer coil 26 to cause the programmer to step from contact 72 to contact 79. Stepping in this instance is limited to one step. Contacts 172 are to be held closed long enough to cock the spring of programmer, as stepping, as was previously explained, occurs after the programmer operating coil is de-energized.

Thus there has occurred a program advance to the next digit to be dialed. The same operation of relay K4 in closing relay contacts 172 provides a pulse through filter resistor 175 to counter 32.

The operation of counter 32 is as follows. First, it is to be noted that each stage of the counter has two SCR devices 180 and 180*a* in series except the first stage which has one. With a pulse applied after a digit has been dialed, which will be applied through a capacitor 105 to each of input SCR devices 180*a* it will be noted that the only one which can "latch on" is the one that has an anode current supply and that is SCR 180*a* in the first stage since in each of the other instances the conditioning SCR's 180 in the upper position have not been fired thus no anode current is available to the triggered SCR's 180*a*. So with the first pulse applied through contacts 172 of relay K4 the first stage SCR 180*a* is turned on and remains on placing an output bias across capacitor 190 and resistor 188 of stage C1 sufficient to operate SCR 180 of stage C2 of the counter. Upon the application of a second pulse which will occur after the dialing of the next digit, the pulse applied to each stage will only latch the second stage as the first stage is already on and the remaining stages have not been conditioned by the turn-on of SCR's 180. Stage latching will progress through the counter with each input signal pulse occurring at the end of each dialing action until stage six is switched on. In stage six operation of relay K5 is delayed to allow the programmer operating coil to cock the armature spring for the seventh digit on the sixth operation of relay K4. After the telephone dial returns to its resting position from encoding the seventh digit K4 is energized and the system is shut off by the combined operation of relays K4 and K5 which remove power momentarily from bus D2. The system is thus made ready for dialing another number.

Figure 6:
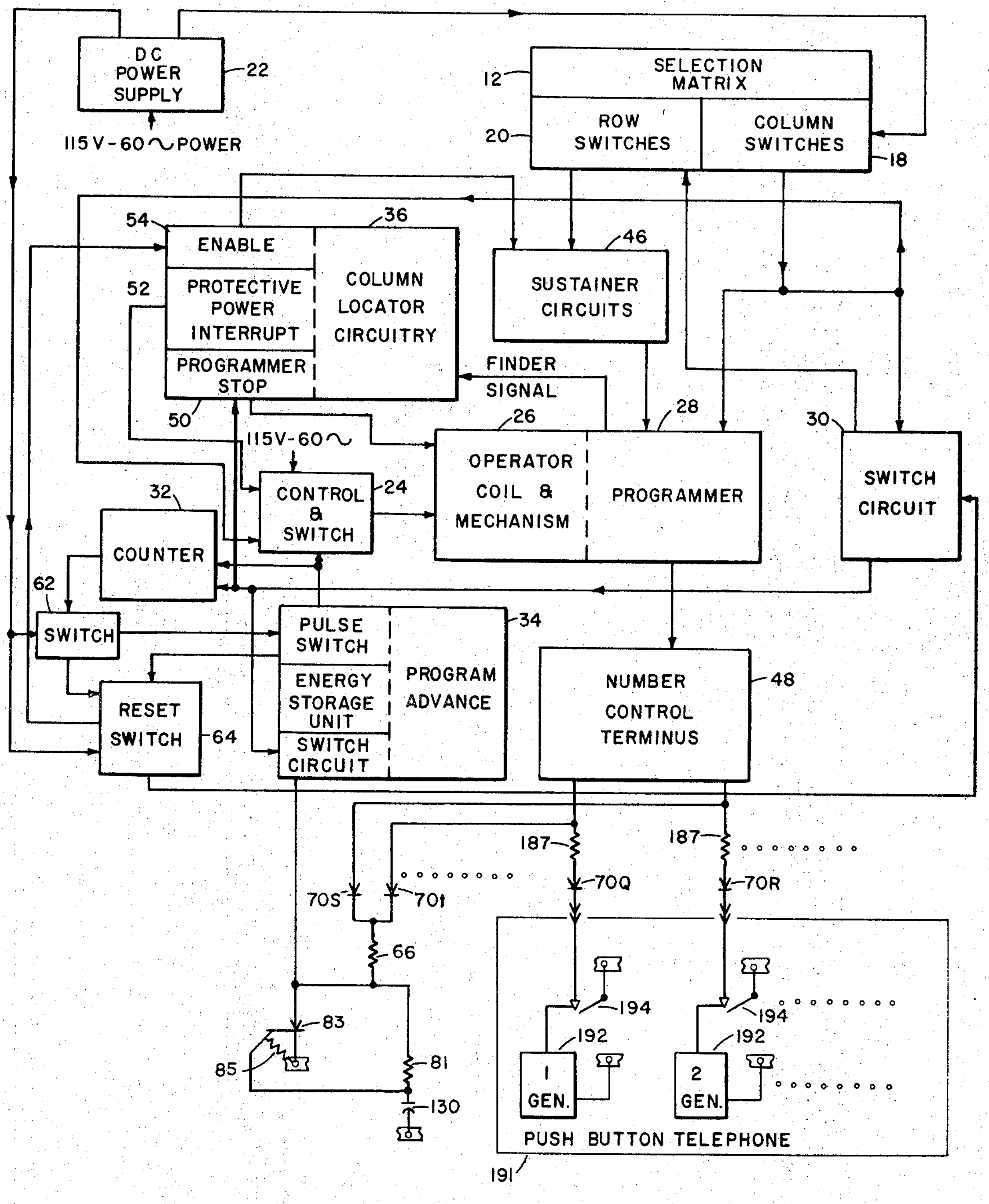
FIG. 6 is a block diagram of a version of the system for use with a push-button telephone.

FIG. 6 illustrates an embodiment of the invention for use in electrical, as opposed to mechanical, encoding in a communication system as, for example, a system for use in automatically operating the number signal generators of a push-button telephone. In this version of the system, mechanical movements, represented by synchrotrol 38, dial drive 44, magnetic clutch coupling 42 and motor drive 40, are eliminated as are related dial synchronizing circuits 56 and control switch 58. The interface with push-button telephone 191 is effected through a purely electrical circuit with the telephone and may be by means of an electrical connector when the selection matrix of this invention is in a separate housing from the push-button telephone; or where the telephone and selection console are one integrated assembly, which they may be, no external connections are necessary. Push-button telephone 191 is broadly illustrated and in it there is a signal generator 192 for each digit one through zero, each generator being manually energized by means of a push-button switch 194 which, upon being closed, applies an energizing potential to a generator 192 which then generates an appropriate signal that is encoded in the communications system. The generators are automatically operated in accordance with this invention by virtue of each being connected through a signal voltage compatability coupling circuit of resistor 187 and isolation diode 70*g* connecting between each generator and its corresponding terminal board of number control terminus 48. The action of programmer 28 in this circuit is to supply current over the path previously described to automatically duplicate manually induced stimulus signals to the code generators of push-button telephone.

Programmer 28 also, however, supplies current through parallel paths through blocking diodes 70*s* etc. and current limiting resistor 66 to coil 163 of relay K3 (FIG. 3) and its contacts 161 close and supply charging potential to capacitor 166, energy storage unit. A time delay RC circuit consisting of resistor 81 and capacitor 130 provide a delayed trigger to SCR 83 which de-energizes relay K3. Resistor 85 provides gate biasing for SCR 83. This is required to achieve a predetermined time interval several milliseconds longer than the maximum interval required for encoding a zero, before a stimulus is applied to the next selected generator. When relay K3 is de-energized, contacts 168 are closed thus discharging capacitor 166 through coil 167 of relay K4 and causing contacts 172 of relay K4 to close for approximately thirty milliseconds thus applying an advance current pulse to programmer operating coil 26. When operating coil mechanism 26 is de-energized by the opening of contacts 172 of K4, the advance spring (not shown) of operator coil mechanism 26 operates to cause moving contacts 76*a* to step to the succeeding contact of the selected set of contacts and current is removed from the initial path and applied to the path corresponding to the next digit of the number to be encoded. The process continues in a like fashion until all digits have been encoded and counter 32 as previously described, accomplishes the system shut-down and reset for encoding the next telephone number.

While the invention has been described with respect to certain specific embodiments it is to be appreciated that the invention is not to be so limited. For example, while the embodiments illustrated are specifically adapted for telephone communications, the system is not limited to such systems and may be employed in electrical communications systems for the communication of data other than voice. Further, while reference is made to the encoding of a "number" which would identify a party it is to be appreciated that other types of symbols can be used in party or station identification. Accordingly, he invention is to be limited only by the true spirit and scope of the invention as set forth in the appended claims.

I claim:

1. An automatic encoder for a communications system comprising:

(A) a switching matrix having a plurality of column responsive switching circuits, each including an operating switch, and a plurality of row responsive switching circuits, each including an operating switch, each combination of row and column switch-circuits defining a set of electrical circuits that determine a communications station identification, comprising a plurality of symbols, to be encoded;

(B) an electrical stepping switch with contacts connected in an arrangement of columns and rows electrically corresponding to that of said matrix and having moving contacts for each row ganged together on a common shaft and each row having succeeding sets of fixed contacts connected to said sets of said circuits, each set representative of a station identification, one set for each said combination of row and column switching circuits;

(C) stepping switch operating means responsive to the momentary operation of a said column operating switch for operating said stepping switch and causing said moving contacts to step from fixed contact to fixed contact of each row;

(D) bias means responsive to the operation of a said operating switch of a particular said column switching circuit for applying a column finding potential to the first contact of a said set in one said row and in the column corresponding to the particular said column switch closed;

(E) column finding means connected to a said moving contact and responsive to said column finding potential for instantly stopping said stepping switch when said moving contact contacts a fixed contact energized by said column finding potential;

(F) row selection means responsive to the momentary operation of a said row switch for applying a potential to the moving contact of a selected row and including means for sustaining the potential so applied after said row switch is no longer operated;

(G) symbol control means comprising a terminal point for each symbol of a station identification, a like symbol contact of each said set of said stepping switch contacts being connected to its like designated terminal point;

(H) symbol encoding means responsive to a potential on a said terminal point for energizing means for generating an electrical signal representative of the symbol code assigned to that said terminal point;

(I) program advance means responsive to a said potential on any one of said terminal points for operating said stepping switch operating means after a predetermined interval following the appearance of said potential and causing said stepping switch to move a potential carrying moving contact to the next contact position to energize the terminal point corresponding to the next symbol to be encoded whereby said next symbol is encoded; and (J) reset means operative after the encoding of the last symbol of a said station identification for blocking the operation of said stepping switch operating means by said program advance means causing said stepping switch to remain in its position and causing said reset means to reset the system to receive a second set of symbols before again blocking the operation of said stepping switch operating means.

2. The automatic encoder set forth in claim 1 wherein said column finding means includes:

(A) a transformer;

(B) a silicon control rectifier;

(C) the input of said transformer being coupled to said first contact;

(D) the output of said transformer being coupled to the input of said silicon control rectifier;

(E) the output of said silicon control rectifier being connected to said stepping switch operating means;

whereby said stepping switch operating means is instantly stopped upon said first contact coming into contact with a said fixed contact impressed with a said column finding potential.

3. The automatic encoder set forth in claim 1 wherein:

(A) said symbol encoding means comprises:

(1) telephone dial drive means including a control clutch for selectively rotating and releasing a telephone dial for the mechanical dialing of a telephone;

(2) control means for energizing and de-energizing said clutch;

(3) means responsive to a potential on any one of said terminal points for operating said clutch control causing said clutch to engage and a dial drive movement to be applied to a said telephone;

(4) dial synchronizer means responsive to the rotary position of said dial drive means and the particular terminal point to which a said potential is applied for operating said clutch control means and causing said clutch to disengage when said dial drive means is operated to a rotary position of a digit symbol represented by the said particular terminal point and initially the first digit of a telephone number to be encoded;

(B) said program advance means comprises means responsive to the return to its resting position of said dial drive means for operating said stepping switch operating means.

4. The automatic encoder set forth in claim 3 wherein said dial synchronizer means comprises:

(A) a drum having a perforation on one end of its periphery, said drum being rotated from a biased resting position by said dial drive means;

(B) an electric light positioned within said drum to emit light through said perforations;

(C) a plurality of light responsive transducers fixed around the periphery of said drum and positioned to be alternately illuminated through said perforation as said drum is rotated by said dial drive means; and (D) a plurality of circuit means, each in circuit with a said terminal point and a said transducer for operating upon said clutch control means to disengage said clutch when a said circuit means is energized by both the light activated said transducer and a potential energized said terminal point.

5. The automatic encoder set forth in claim 4 wherein said program advance means comprises:

(A) a plurality of perforations around one end of the periphery of said drum of said synchronizer means;

(B) a light responsive transducer fixed and mounted to receive light from said plurality of perforations when said drum is rotated; and (C) a light shield mounted on said drum to prevent light from said perforations to be transmitted to said last named light responsive transducer when said drum is on or near its resting position.

6. The automatic encoder set forth in claim 5 wherein reset means includes a counting circuit comprising:

(A) a first registering stage comprising a silicon control rectifier, an output time delay circuit and a source of operating bias being connected in series with said SCR and said output time delay circuit;

(B) a plurality of stages corresponding to the number of digits to be dialed less two connected in cascade following said first stage wherein each said stage of said plurality of stages comprises first and second SCR devices, an output time delay circuit and a source of operating bias, all being connected in series;

(C) coupling means for coupling between intermediate said stages of said counter and comprising a diode coupling the output of one of said stages to an input of a second said SCR device of a following said stage;

(D) a counter input circuit means for applying an operating input signal to said first SCR of each said stage from said program advance means; and (E) counter reset means connected to the output load circuit of the last said stage and responsive to the operation of said last stage for removing said source of operating bias from said counter stages and operating bias from said program advance means.

References Cited

UNITED STATES PATENTS 3,305,644 2/1967 Watanabe ---------- 179—90

KATHLEEN H. CLAFFY, Primary Examiner

T. J. D'AMICO, Assistant Examiner

U.S. Cl. X.R.

340—359